Nov. 4, 1941.   P. C. CHOATE   2,261,872
CONTINUOUS PROCESS FOR MAKING REACTED PLASTER
Filed June 8, 1938
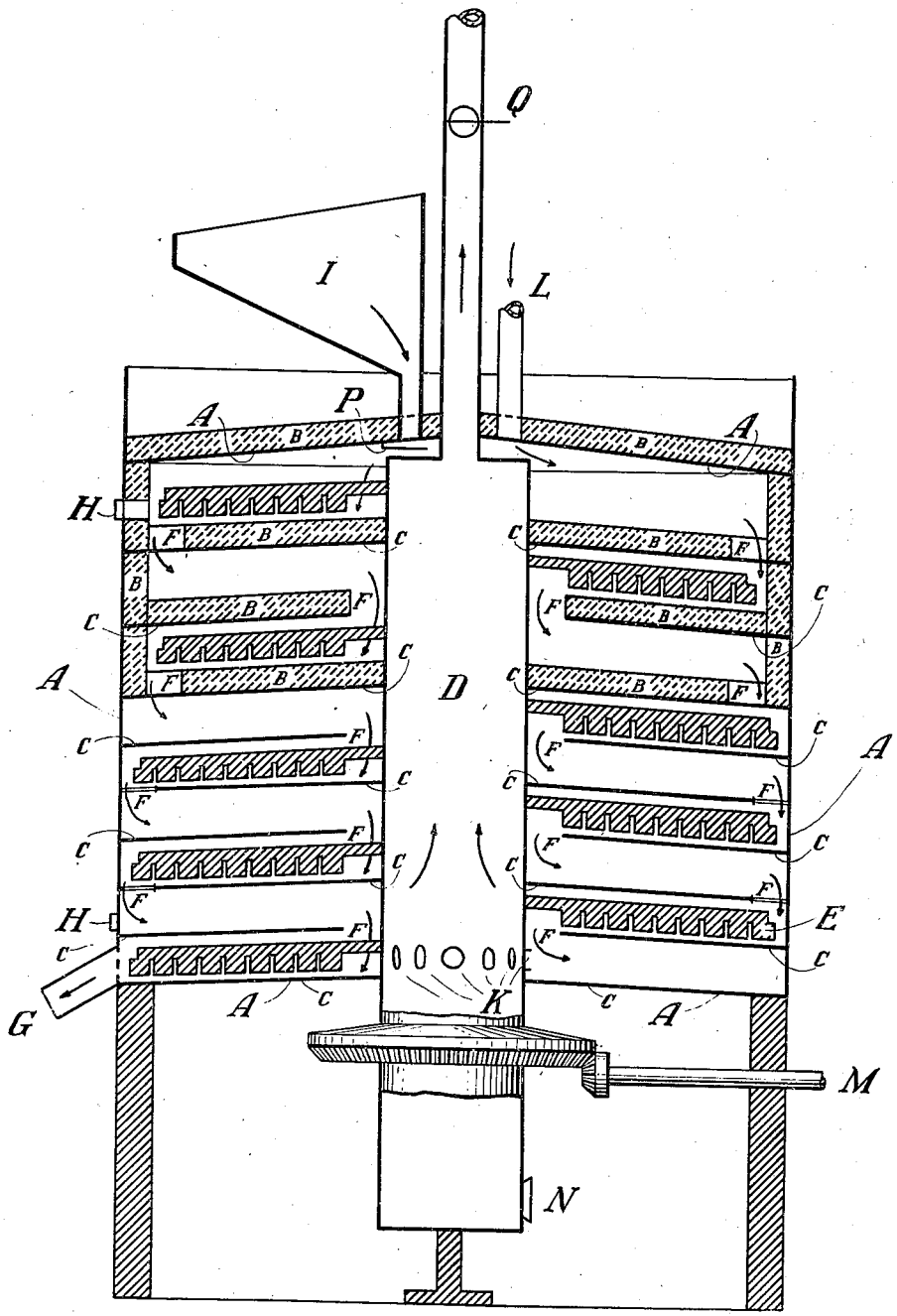
Inventor:
Parker C. Choate.

Patented Nov. 4, 1941

2,261,872

UNITED STATES PATENT OFFICE 2,261,872

CONTINUOUS PROCESS FOR MAKING REACTED PLASTER

Parker Cogswell Choate, Essex, Mass.; Anna W. Choate and Dana T. Gallup executrices of said Parker C. Choate, deceased Application June 8, 1938, Serial No. 212,602

5 Claims. (Cl. 106—110)

This specification describes the process of reacting caustic lime with gypsum rock continuously to form a mixture of lime hydrate and calcined gypsum in varied proportions, which may be termed "reacted" plaster, as distinctive from mechanical mixtures.

Lime hydrate is now made by mixing caustic lime with water, producing a hydrated product with varying quality.

The lime hydrate thus obtained differs from that obtained by reaction with gypsum, because the rate, vapor tension and temperature of $H_2O$ supply differs. The caustic hydration act is very exothermic.

Gypsum, as now calcined, is treated in pots by indirect heat action, or in revolving cylinders by convection of hot combustion gas currents, both acts liberating $H_2O$ vapor.

Because of poor conductivity of mass, calcination is uneven and sluggish, as compared with calcination of gypsum through temperature created by admixed caustic lime absorbing $H_2O$ vapor, resulting in uniform heat and product, if physical conditions are controlled as herein taught.

The calcination of gypsum is an endothermic reaction, perhaps consuming a fourth of the excess heat generated by a reacting equivalent of caustic lime.

Caustic lime is defined as CaO with inert minor impurities also MgO often present in large proportion, practically inert where CaO is active. The trade term is quick lime. MgO, as calcined at proper temperatures lower than CaO, may be active and form a quick lime of analogy to CaO.

Gypsum rock has formula $CaSO_4.2H_2O$ with minor impurities, and forms a stable calcine $CaSO_4.\frac{1}{2}H_2O$, also anhydrites $CaSO_4$, with allotropic characteristics, both of importance in the products here taught.

The heat balance of the exothermic action, from initiated caustic lime-gypsum mixtures in reacting proportions, is adequate, under normal mass conditions, to raise the mass temperature to over 200° C. and the time of such action depends upon factors, involving fineness, temperature, chemical activity and atmosphere.

CaO (caustic lime) and water react easily at normal temperatures, but the caustic lime-gypsum mixture requires a temperature of about 80° C. to overcome the endothermic dehydration of gypsum, while to practically complete the reaction, a temperature of about 180° C. usually exists.

After initial temperature of reaction in a part, the mass rapidly propagates temperature, and, if the act is conducted properly, carries the hydration and dehydration to completion at 200° C. approximately as desired.

Changes in vapor pressure, such as action of carrier gas, or degrees of vacuum or pressure, vary the temperature of ebullition, but do not affect the reaction otherwise.

Caustic lime has such strong affinity for water that the feeding of water upon the caustic lime, as in usual hydration, creates gas explosions and involves particle loss, and nuisance.

The vapor action, here taught, avoids such phenomenon.

Gypsum shows decomposition at 80° C. but a change is noted as low as 50° C. and either itself or its modified hydrates soften, become pasty, so as to clog grinding machines, and form coherent masses in reacting containers. The calcines of gypsum, at higher temperatures, are non-pasty.

Where static caustic lime-gypsum mixtures in non-tumbled masses are reacted, this pasty property of gypsum defeats reaction by cementation, closing voids, defeating atmospheric circulation, thus CaO hydration and a uniform mass temperature reaction. Liberated $H_2O$ escapes, often by explosion, leaving craters, and unacted-upon or over-burned portions.

This condition is not recognized and not provided for in previous academic descriptions of the application of the caustic lime-gypsum reaction, but is vital to economic reaction and herein taught. This process constitutes the only known method of practically conducting a continuous economic reaction.

If caustic lime is mixed into warm crushed gypsum, the mass gums up, but if gypsum is fed into caustic lime the gumming is avoided, illustrating a tendency to form pasty masses unless means are used to avoid.

All trials have failed to produce a continuous process, where caustic lime-gypsum mixtures were placed in, or fed through, cylinders or mass containers and allowed to react statically, with or without gravity settling or mass movements, and worse conditions prevailed if extraneous heat was applied.

Either the atmosphere, or the physical conditions, defeated practical results, as such acts resulted in craters, explosions, or complete clogging.

Static, gravity, or non-aerated processes appear inoperative and are disclaimed.

Batch processes as non-tumbled are not uniform or economic in product, but if tumbled, thus aerated and mixed during reaction, are uniform and such is described in U. S. Patent #2,127,952, by applicant. Such batch processes involve the novel act of tumbling with aeration to enable practical operation, but are not continuous, which latter act requires graduated phases of feed, time of zone heat action with a traveling atmosphere, and constant zone temperature maintenance, supplying, by reaction heat generation, a continuous initiation temperature.

This continuous process permits much greater variation in mix proportions used, thus product proportions, because of ability to change feed at will, and control mass temperature and mass atmosphere, by changing air and H2O supply, which is continually separated and not a fixed part of mass as in batch action, or known in previous art.

This specification so far, explains the status of the art, and will now teach and describe useful and novel improvements.

Inventor has discovered that, if he continuously passes by tumbling action a mixture of caustic lime and gypsum, in variable degrees of fineness, assume a hammer-mill product, over hearths or plates in a layer, assume two inches in thickness, more or less, and exposes such feed to air, as an inert carrier gas, allowing the traveling mixture to assume reaction temperature, under time regulation, a very complete reaction results, at temperatures of 200° C., substantially, and, due to multiple zone action, the process is continuous.

Many theories may be evolved, and many types of apparatus may exist, and a wide variety of mixtures of limes and gypsums, with or without added water to supply H2O to supplement that in a gypsum, may be employed. Inventor claims as his invention broadly; the act of continuously reacting a loose traveling tumbling mixture of caustic lime and gypsum upon a hearth or multiple of hearths in a current of gas and vapor, as a means to practically enable the transfer and absorption of H2O with an extraneous supply of hot or cool air or H2O vapor existing in degree as desired.

The specification defines a hearth as any surface where loose aerated layers are reacted, and traveling, as designating continuous movement from feed to discharge as distinctive from batch action, where mass reaction exists with no traveling or extraneous air circulation.

Aeration is defined as the presence of a gas or vapor filling voids, and carrier gas, as one that will carry H2O vapor in non-condensable form under the conditions described.

The depth of reacting layer, size of particle and looseness, and tumbling nature or means, are obvious issues of degree involving the physical character of materials used, and are specified, as adequate to prevent irregular reaction.

In the diagram sketch a special design of multiple circular shelf furnace is shown, having a downward circulation of gas and air current passing with the caustic lime-gypsum feed, such gas current ultimately passing up through a centre flue, which revolves, carrying arms with ploughs to enable travel with tumbling of the reacting mass. The design is illustrative, and permits wide variation in practice.

A indicates a steel retaining shell.

B indicates linings to conserve caloric in portions as desired.

C indicates hearths discharging by gravity and constructed of metal or other material with or without mass heat recuperating means, as desired in initiation and control of temperature.

D indicates the centre revolving flue, hollow to enable exhaust of gas and vapor.

E indicates rabble arms, with ploughs.

F indicates openings in hearths to allow travel of gas and material.

G indicates openings where discharge is regulated.

H indicates doors of access to hearths. Arrows show direction of flow of material and gas.

I indicates hopper intake or feed.

K indicates opening for exhaust on bottom hearth into center revolving flue.

L indicates air and H2O intake, at top of furnace.

M indicates power drive.

N indicates clean out at the bottom of revolving flue.

P indicates a feed device partially shown.

Q indicates damper, in exhaust flue.

Details, such as power means, dampers, or feed devices, materials used, heat insulation, or radiation, temperature indicating apparatus, and other means, are obvious, and no apparatus is a part of this invention, but desirable to show means.

The operation of such pictured furnace apparatus will be obvious, and varied in degrees to meet the varied treatments that this process involves in treating various active mixtures to produce varied mixed products, involving varied temperature control, and varied supply of air and water to enable the degree of reaction desired.

The invention involves a continuous feed and discharge action upon hearths, the layers of caustic lime-gypsum mixture being progressed and tumbled by ploughs, while a small adequate current of air is fed with the charge, and travels with such charge, such air and vapor current being separated at the discharge end of the reaction apparatus.

This action enables continuous feed with aeration and graduated control of temperature, as the mixture travels over separated hearths, providing heat zones. Air and mixture entering, reacts to 200° C. or above and cools in travel to less than 149° C. at discharge, when the manufacture of hemihydrate calcine is involved. The cooling of the discharge is unimportant where insoluble anhydrite forms the product in admixture with lime hydrate, because at 200° C. and more the product is fixed, a non-desiccant.

While the reaction is rapid at the start, dependent upon activity of materials in the mixture, such rapid reaction initiated in temperature by contact with the hot hearth surface, is incomplete, creating poor quality plaster, unless time is given by travel over adequate hearth areas to fully calcine gypsum, to rehydrate the desiccant $CaSO_4$, and or hydrate CaO, also fully invert soluble anhydrite to the insoluble or allotropic form, when desired in product.

Excess air or water as vapor may be fed to any hearth to control and modify hearth temperatures, so long as the discharge plaster and exhaust gas does not drop below 100° C., as $CaSO_4.\frac{1}{2}H_2O$ is not a desiccant of $H_2O$ vapor but absorbs its condensations.

In economic practice gypsum requires up to 180° C. to enable complete dehydration, and 200° C. is a more commercial temperature easily carried in the described process of reaction. A temperature up to 300° C. may be desirable where invertion of anhydrite is desired.

Unless the $CaSO_4 2H_2O$ is completely converted into $CaSO_4.\frac{1}{2}H_2O$, crystals of the former will exist to accelerate the plaster set undesirably, and unless CaO is completely hydrated, later hydration may disturb plaster set, while if an inverted allotropic form of anhydrite is to be the form of gypsum calcine, the soluble anhydrite form must be fully inverted or the unstable anhydrite will modify the plaster action.

Theory decomposes gypsum under 149° C. and the hemi-hydrate above 149° C., so that in practice a product at 180° C. to 200° C. will be theoretically anhydrite, $CaSO_4$, but more or less hemihydrate will exist due to time involved in decomposing the $CaSO_4.\tfrac{1}{2}H_2O$ molecule. At 180° C. there will be no appreciable $CaSO_4.2H_2O$ existing after a few minutes of tumbling aeration exposure and no $CaSO_4.\tfrac{1}{2}H_2O$ after circa one hour of such tumbling exposure.

As the desiccating or unstable molecule $CaSO_4$ called soluble anhydrite is not desired in the finished product, but must form to assure gypsum decomposition within an economic time period, this process specifies the rehydrating of the anhydrite after reaction during cooling stages, by means of $H_2O$ vapor contacting with $CaSO_4$ and forming $CaSO_4.\tfrac{1}{2}H_2O$ below 149° C.

This act is part of the continuous process to form reacted plaster mixtures of $CaO_2H_2$ and $CaSO_4.\tfrac{1}{2}H_2O$. To accomplish such a result, $H_2O$ vapor must contact at proper temperatures after reaction, and adequate time and hearth surface must exist.

The above specification involves the formation of hemi-hydrate $CaSO_4.\tfrac{1}{2}H_2O$ in the reacted plaster, but when the allotropic non-desiccating $CaSO_4$ is to be formed, the hydration and lowered temperature on the lower hearths is not used.

Such allotropic anhydrite will be later described in this specification and merely requires reaction temperatures on the hearths sustained, usually above 250° C., for a time adequate to completely invert the soluble anhydrite first formed.

To make reacted plaster continuously, caustic lime and gypsum, both crushed, as by a hammer mill, are fed to such an apparatus as herein described, mixing, as or, before reaching the treatment hearth.

The fineness of the feed is proportioned to convenience, character of raw material, etc., but may be ½″ in cross section with fines.

A variety of mixtures may be used, from slow reacting dolomites, to active calcites, the gypsum rock proportioned by weight from ½ part to 3 parts with the caustic lime used.

The low gypsum mixtures need water supplied as a vapor or mist to hydrate excess CaO present, and if a dolomite, extraneous heat, to maintain adequate reaction temperature, as by means of hot air or $H_2O$ vapor or recuperative hearths.

The high calcite mixtures react with greatest caloric yielding 250° C. in temperature, if not cooled.

A mixture with 1½ to 2 parts of gypsum to 1 part of CaO by weight approaches theoretical reacting proportions and runs the most regular.

A mixture carrying three parts by weight of gypsum provides excess $H_2O$ vapor over that which can be absorbed by the CaO present. The excess caloric of reaction is often able to calcine such excess gypsum, while the excess $H_2O$ vapor is carried off by the exhaust air current if not reacting to form $CaSO_4.\tfrac{1}{2}H_2O$ or $CaO_2H_2$, on the lower or cooling hearths, otherwise extraneous heat may be necessary to maintain adequate mass temperatures.

This continuous process thus describes novelty in the manufacture and control of mixtures of wide variation, obtaining a homogeneous product of varied content in $CaO_2H_2$ and $CaSO_4.\tfrac{1}{2}H_2O$, or non-desiccating inverted anhydrite $CaSO_4$.

To start operations, oil, gas or coal may be burned upon the upper hearths until a temperature of 100° C. or more is obtained, when the hearths will have absorbed adequate heat to ignite the mixture.

Heating up to temperatures of mass reaction may be obtained by feeding caustic lime and water to store heat in the hearths prior to mixed feed reaction, or other means used, not novel in act, nor a part of this invention.

Any practical means may be employed to obtain initial temperature of reaction, following which, mixture fed upon the hearth will readily, in minutes of time, assume a temperature of reactivity condition above 149° C., that may run up to 250° C. on the upper hearths.

As the process is continuous, the feed is regulated to maintain desired conditions, which involve rates from say, 100 lbs. to 200 lbs. per hour, per square foot of area of active hearth surface, as a general description.

The lower hearths are relatively inactive or cooling and will be equal in area or greater than the active or exothermic area.

The lower hearth action is necessary in finishing both the hydration of CaO, also the hydration of $CaSO_4$ to $CaSO_4.\tfrac{1}{2}H_2O$, or change of any soluble anhydrite, thus perfecting the plaster quality because of necessary time contact with the hot gas and vapor supplied by the exothermic zones of reaction. No desiccating soluble anhydrite should exist in the product.

The charge and discharge should be synchronously timed in rate, under control.

The air admitted with the feed is regulated by the exhaust passing downward with the product, but the amount caused to pass down with the feed product may be supplemented by hot or cool air or $H_2O$ as vapor, fed for controlling action, at the top, or at any hearth level.

The reacted decrepitated mass consists of fine particles of lime hydrate and calcined gypsum, with impurities, also any inert MgO, which is largely not hydrated.

The discharge product may be pulverized or otherwise prepared for market.

Varied products can be formed by employing varied mixtures, reacting under varied controlled mass temperatures, and by the use of hygroscopic catalytic agents, also the admixture of varied substances to modify the product physically.

Practically none of the products can be economically produced, or the reactions involved completed with practical efficiency, except by the act of aerated tumbling.

This specification describes tumbling by ploughs on hearths, as a continuous process, but the analogous products can be made by a batch tumbling apparatus, such as rotating drums.

Hygroscopic salts, such as alums, the sulphates of potassium, sodium, magnesium, zinc, phosphoric acid, etc., when admixed in catalytic percentages ½% to 2%, act to transfer $H_2O$ to the so-called insoluble anhydrite, making it slowly soluble, enabling a plaster set within usually one to three hours, as distinctive from days or infinity for the insoluble anhydrite not so catalyzed.

Such catalytic salts, may be a part of the gypsum used, or may be admixed as desired, best prior to reaction.

This process claims and teaches such acts and results.

The products cannot be distinctively defined by time to set, hardness, density, etc., as such physical characteristics are duplicated, both in greater and less degrees, by other cement products, but can be defined by specifying the non-desiccating anhydrite and catalytic hygroscopic salt in a reacted mixture, also the resetting property of anhydrites, with molecular structure of the reacted lime-gypsum particle enabling resistance to solubility and frost disintegration when thawing, implying that neither water contacts on a dry wall, nor freezing of wet plaster will cause disintegration, as is usual with gypsum plaster.

Several distinct products can be manufactured by processes here taught and described with novelty.

The hemi-hydrate calcine of gypsum admixed with lime hydrate is formed when the reaction temperature does not exceed about 200° C. for any length of time, not usually to exceed two hours, because such exposure will decompose all $CaSO_4.\frac{1}{2}H_2O$, and not threaten the invertion of the soluble anhydrite, and up to two hours exposure upon the lower cooling hearths will safely rehydrate all the soluble anhydrite to the hemihydrate at temperatures below 149° C. in a current of $H_2O$ vapor.

The inverted allotropic anhydrite in admixture with lime hydrate is formed as a novel product here taught by reacting at or under 300° C. as follows.

If the non-desiccating anhydrite plaster is desired, the exposure at 250° C. for three hours, appears all that is necessary in many cases to enable a set of one hour or so in time, but no fixed relation can be given the time of exposure being empirical, modified by the mixture, product desired, and the $H_2O$ atmosphere.

The lime hydrate present is not affected by the temperature up to 450° C., where $H_2O$ vapor is present, and such temperatures can be used by means of extraneous heat applications, if the character of the calcined gypsum so dictates, as temperature materially changes the type of inverted allotropic anhydrite, with the time involved, modified by the $H_2O$ atmosphere present.

In the act of invertion, tests show that insoluble allotropic anhydrite does not form at temperatures much below about 300° C. except on say twenty-five hours of heating at 200° C., while at 250° C. two hours is necessary and only at 300° C. approximately is instantaneous invertion obtained.

Lime hydrate is not effected in quality up to temperatures above 300° C.

Thus the claimed products are taught in manufacture and composition and characteristics.

Anhydrite has the property, that, when the hardening putty is broken up after setting, the mass may be re-tempered with added water and yield a new set, but not as hard as the first.

Activated anhydrite is non-desiccating anhydrite catalyzed to hydrate, forming a "slowly soluble" or setting plaster, as distinctive from plaster of Paris setting in minutes, and the "infinity" of the dead burned or "insoluble" anhydrite.

Non-desiccating is defined as having the property of not absorbing $H_2O$ from the atmosphere, the reverse of the soluble desiccating anhydrite formed at lower temperatures prior to invertion.

The term "reacted" as here used covers the exothermic transfer and absorption of $H_2O$ here taught, not effected by the hygroscopic salts employed as catalysts or the heat action up to about 300° C., and such "reaction" produces a product or molecule of more intimate and homogeneous characteristics, than mechanical mixtures of lime hydrate and calcined gypsum in its resistance to water action when a dried wall is wetted with water after setting or a wet wall is frozen before drying.

Hemihydrate $(CaSO_4.\frac{1}{2}H_2O)$, formed by the rehydration of soluble anhydrite $(CaSO_4)$, is a harder setting salt than otherwise, thus the product made by first decomposing all the $CaSO_4.\frac{1}{2}H_2O$ by adequate exposure up to 200° C. with subsequent reforming, is a distinctly harder denser product than otherwise.

Such wetting produces less disintegrating or disfigurement and this reaction process is presented as a degree of waterproofing, a physical property while said freezing will not produce the usual crumbling of the plaster mass, after drying, an added physical relation.

Having described the process and the products thereby formed, the following claims are presented for patent protection;

1. The process of forming mixed lime hydrate and hemi-hydrate plaster, which consists in causing mixtures of caustic lime and gypsum to pass through a heat zone above 150° C., adequate to decompose hemi-hydrate, then causing the mass to pass to a zone below 150° C. adequate to reform any hemi-hydrate previously decomposed, such zone heating being a continuous act performed upon a traveling rabbled mass layer upon hearth surfaces, while contacted with adequate $H_2O$ vapor and air currents to enable lime hydration and hemi-hydrate formation, with mass aeration.

2. The process of compounding substantially molecular uniform homogeneous lime-gypsum plaster, comprising progressively feeding and simultaneously tumbling a caustic lime and gypsum mixture from entrance to exit through a series of continuously connected graduated heat zones, ranging in temperature from circa 200° C. to circa 100° C. to initiate an inter-exothermic reaction of the caustic lime and gypsum, simultaneously passing currents of air and water vapor through said zones, decomposing the gypsum to form an anhydrite in the heat zones, and hydrating the calcium oxide to form calcium hydrate, also any soluble anhydrite to become hemi-hydrate in the zone below 149° C.

3. The process of forming mixed lime hydrate and non-desiccating anhydrite, which consists in continuously passing a loose tumbling mixture of caustic lime and gypsum in the presence of currents of air, through a heated zone having a temperature of 250° C. or higher, to react the same, and adequate by time and temperature to invert the soluble anhydrite, then passing the product through cooling zones, while simultaneously subjecting the said mixture to the contact of water vapor.

4. The process of forming an inter reacted mixture of caustic lime and gypsum, comprising continuously feeding a mixture of caustic lime and gypsum through a series of heated zones graduated in temperatures, ranging from substantially 250° C. to substantially 100° C., and simultaneously subjecting said moving mixtures to currents of hot air and water vapor, whereupon a reaction takes place in the mixture, as it passes through the higher temperature heat zones and a cooling action with hydration in the lower temperature zones.

5. The process of making a lime gypsum plaster, which consists in continuously feeding a tumbling reacting mixture of loose caustic lime and gypsum into and through a series of heat zones ranging in temperature from circa 200° C. to circa 149° C. for a period of about two hours, and then passing the reacted mixtures through a series of cooling zones, not falling below 100° C.

PARKER COGSWELL CHOATE.